United States Patent [19]

Chadwick

[11] 3,822,636

[45] July 9, 1974

[54] INSULATED SMOKESTACK CONDUITS

[76] Inventor: Brian Chadwick, 1 Fieldstone Bay, Winnipeg, Manitoba, Canada

[22] Filed: Oct. 16, 1972

[21] Appl. No.: 297,787

[52] U.S. Cl................ 98/60, 110/184, 138/113, 138/149
[51] Int. Cl........................ F23j 11/00, F16l 3/16
[58] Field of Search.......... 138/148, 149, 113, 116, 138/100, 101, 108, 155; 137/375; 49/DIG. 1; 285/48, 138, 47; 110/184; 98/60

[56] References Cited
UNITED STATES PATENTS

| | | | |
|---|---|---|---|
| 2,423,213 | 7/1947 | Weber | 285/47 |
| 2,765,182 | 10/1956 | Williamson, Jr. | 285/138 X |
| 2,914,090 | 11/1959 | Isenberg | 138/113 |
| 2,915,089 | 12/1959 | Horsting, Sr. | 138/113 |
| 2,980,448 | 4/1961 | Holben | 285/47 |
| 3,492,029 | 1/1970 | French et al. | 285/47 |

*Primary Examiner*—Richard C. Queisser
*Assistant Examiner*—Daniel M. Yasich
*Attorney, Agent, or Firm*—Stanley G. Ade

[57] ABSTRACT

An outer cylindrical casing is provided and a concentrically located inner cylindrical casing is supported therein with means cooperating between the inner and outer casing to permit radial and longitudinal expansion of the inner cylindrical casing without transferring the stresses to the outer casing. The means cooperating between the two casings include floating support and centering devices. Insulation is provided between the casings and the heat reflecting shield between the insulation and the inner casing reduces transfer of heat from the inner casing to the outer casing.

4 Claims, 8 Drawing Figures

PATENTED JUL 9 1974 3,822,636

PATENTED JUL 9 1974                3,822,636

INSULATED SMOKESTACK CONDUITS

BACKGROUND OF THE INVENTION

This invention relates to new and useful improvements in insulated conduits for the transmission of fluids and although it is designed specifically for a chimney construction, nevertheless it will of course be appreciated that it can be used in the conducting of any hot fluids such as hot gases, petrochemical fluids, hot exhaust gases and the like.

Normally such insulated conduits, particularly in chimney construction, consist of an inner casing and an outer casing with the inner casing being concentrically mounted within the outer casing and having insulation therebetween. The provision of the insulation is an attempt to prevent the temperature of the inner surface falling below the dew point temperature of the gases and vapours flowing therein.

Some of the constituents of the gases and vapours, in contact with the low temperature inner surface of the flue, condense on the low temperature inner surface and form corrosive liquids and the inner surface of the flue therefore corrodes as a result of this chemical action.

With existing double skin chimneys with flanges which pass through the thickness of the double skin wall from the inner skin or casing to the outer skin or casing, in order to join the inner skin to the outer skin, heat is conducted away from the inner surface of the flue to the outside of the chimney at and in the immediate vicinity of the point where the flanges are joined to the inner skin. Therefore the temperature of the inner surface of the flue in the said areas is reduced below the dew point temperatures of gases and vapours flowing therein so that localized corrosion occurs.

SUMMARY OF THE INVENTION

The present invention overcomes these disadvantages by providing a thermal break between the inner and outer casings or skins thus preventing heat from being conducted from the inner skin to the outer skin.

Furthermore the existing structure eliminates the generation of differential stresses and strains normally present in existing double skinned chimneys where the inner skin or flue is directly and structurally attached to the outer skin or casing, it being understood that differences in temperatures between the inner and outer casings cause differential longitudinal and radial expansion to occur between the inner and outer casings and of course the inner and outer portions of conventional flanges.

The present invention permits the inner casing or flue to freely expand both radially and longitudinally as necessary without the generation of stresses and strains being transmitted to the outer casing.

In order to permit the aforementioned longitudinal expansion, self-sealing telescopic expansion joints allow free longitudinal expansion to occur as necessary, these joints being packed with compressed packing thus eliminating the passage of gases and vapours between the inner flue to the annular void between the inner and outer casings.

The inner casing or flue is both supported and located concentrically within the outer casing by floating centering devices and these devices at the upper ends of the chimney sections fulfill the function of both supporting and centering the inner flue or casing whereas similar devices at the lower ends of the chimney section fulfill the function of centering the inner casing within the outer casing.

Another object of the invention is to provide a device of the character herewithin described in which the inner skin or flue portion of each section is supported entirely within its own section independently of any other section so that the total weight of all inner sections of the casing is not vertically transmitted downwardly to the base of the stack as a separate structural element. The total weight of the inner casing is carried by the outer casing which thus forms the main structural element of the stack or conduit, and this main structural element is of course not adversely affected by the flue gas corrosion as is the case with conventional double skin chimneys or conduits where the inner skin is an inherent part of the structural element of the stack.

A further object of the invention is to provide a device of the character herewithin described in which adjacent sections of the stack or conduit can be bolted or welded to one another to facilitate the construction thereof.

A still further object of the invention is to provide a device of the character herewithin described which can be used either as a free standing type construction or a guy wire supported construction.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:-

DESCRIPTION OF THE DRAWINGS

In the drawings like characters of reference indicate corresponding parts in the different figures.

DETAILED DESCRIPTION

Figure 1:
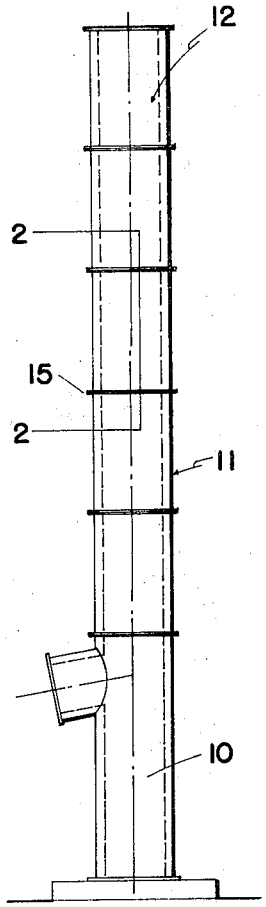
FIG. 1 is a side elevation of a typical insulated chimney stack assembled according to the present invention.

Proceeding therefore to describe the invention in detail, reference to FIG. 1 will show a chimney construction which includes a base section collectively designated 10, intermediate sections collectively designated 11 and a top section collectively designated 12. In the drawings, a sectional view of the intermediate sections or portions 11 is illustrated but of course, similar construction applies to the sections 10 and 12.

Figure 2:
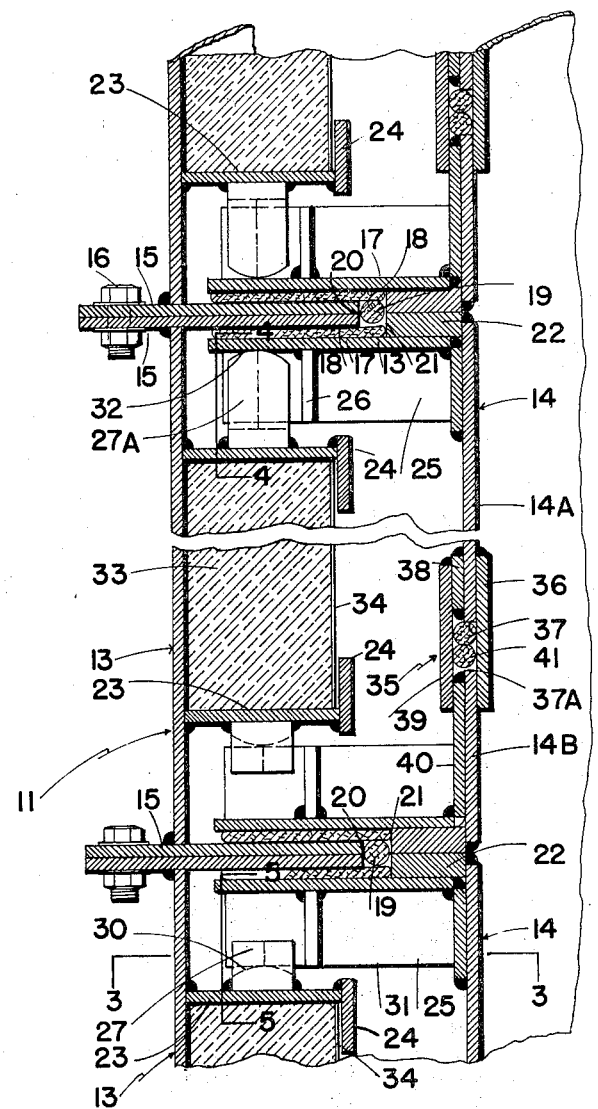
FIG. 2 is an enlarged section substantially along the line 2—2 of FIG. 1 and showing one embodiment of the device.
Figure 3:
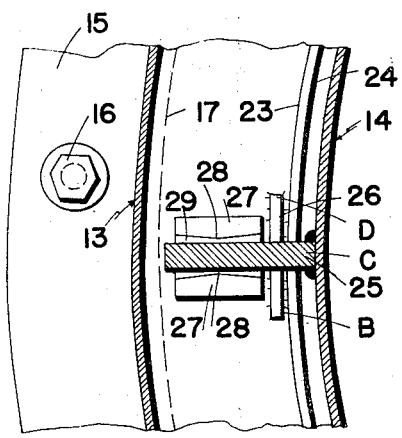
FIG. 3 is an enlarged fragmentary sectional view along the line 3—3 of FIG. 2.
Figures 4, 5:
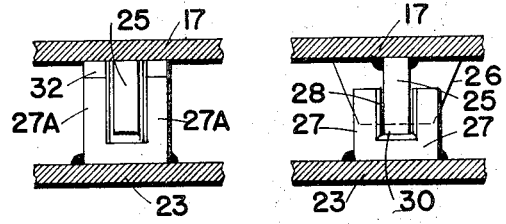
FIG. 4 is an enlarged section substantially along the line 4—4 of FIG. 2.
FIG. 5 is an enlarged section substantially along the line 5—5 of FIG. 2.

Dealing first with the embodiment shown in FIGS. 2, 3 and 4, reference character 13 shows an outer cylindrical casing and 14 an inner cylindrical casing.

Peripheral attaching flanges 15 are secured as by welding to each end of the outer casing 13 and these flanges extend outwardly of the casing 13 and may be bolted together by means of nut and bolt assemblies 16 as clearly illustrated, it being understood that there is a plurality of such nut and bolt assemblies around the peripheral junctions between adjacent sections 11.

A peripheral flange 17 is secured to the inner casing 14 and extends radially upwardly therefrom all around the inner casing, there being a flange 17 situated adjacent each end of the inner casing 14.

Gaskets 18 are provided between adjacent flanges 17 and 15 as clearly shown and packing material 19 is provided adjacent the inner ends 20 of flanges 15 and outer ends 21 of abutting annular flanges 22 extending inwardly from each end of the inner casing 14 so that no direct heat conducting contact is present between the inner and outer casings even when two sections are bolted together.

Means are provided to support the inner casing concentrically within the outer casing and to allow radial expansion and contraction of the inner casing relative to the outer casing and FIGS. 4 and 5 show two embodiments of this means.

Dealing first with the embodiment shown in FIGS. 2 and 5, a further annular flange 23 is secured to the inner wall of the outer casing 13 and extends inwardly therefrom and is provided with an annular collar 24 welded to the inner edge thereof.

A plurality of supporting lugs 25 extend radially from the inner casing and are secured to the surface of the flange 17, said lugs being braced by side members 26 welded thereto.

Pairs of brackets 27 are welded to the second mentioned flange 23 and each pair of brackets is engaged freely by one of the support lugs 25.

The inner walls of each pair of brackets angulate inwardly to a common apex 28 as clearly shown in FIG. 3 and the dimensioning of the lugs 25 and the brackets 27 is such that some slight clearance exists between the lugs and the apecies 28 of each pair of brackets thus permitting slight circumferential movement of the inner casing relative to the outer casing. This mounting also permits radial expansion and contraction of the inner casing relative to the outer casing.

The base 29 of each pair of brackets is radiused as shown by reference characters 30 (see FIGS. 2 and 5) and the contacting edge 31 of the lugs 25 engages the highest point of this radius thus giving a point contact to support the inner casing relative to the outer casing and reducing the actual heat transferring connection between the inner and outer casings to the minimum.

FIG. 4 and FIG. 2 show an alternative embodiment of this support and centering device in which the lugs 25 are of similar configuration but the brackets 27A extend upwardly upon each side of the lug 25 and are provided with radiused outer ends 32. These radiused outer ends engage the surface of the first mentioned annular flange 17 upon each side of the lugs 25 with a similar reduced point contact as clearly shown in FIG. 4.

The major annular area defined by the outer casing 13, the flanges 23 and the collars 24 are filled with conventional insulating material 33 and a cylindrical radiant heat reflecting shield 34 made of polished sheet metal or the like, is engaged within the collars 24 and reflects heat back from the inner casing 14, it being understood that this heat reflecting shield extends practically the full length of the sections with the exception of the lug and bracket assemblies 25 and 27 hereinbefore described.

Means are provided on the inner casing to permit longitudinal expansion and contraction relative to the outer casing and dealing first with the embodiment shown in FIG. 2, a sliding joint assembly collectively designated 35 is provided.

This telescopic sliding joint divides the inner casing into an upper portion 14A and a lower portion 14B and consists of an annular sleeve 36 secured as by welding to the inner end of the outer portion 14A of the casing, said sleeve extending beyond the inner end 37.

A spacer band 38 is welded to the inside of the casing adjacent end 37 and a further sleeve or annular band 39 is secured as by welding to this spacer so that it lies spaced and parallel with the aforementioned annular sleeve 36.

The lower portion 14B is provided with a spacer band 40 welded internally so that the thickness of this spacer band and the portion 14B is similar to the space between the bands 36 and 39. This forms an expansion joint and annular packing 41 is provided between the end 37 of the portion 14A and the end 37A of the portion 14B.

Figure 6:
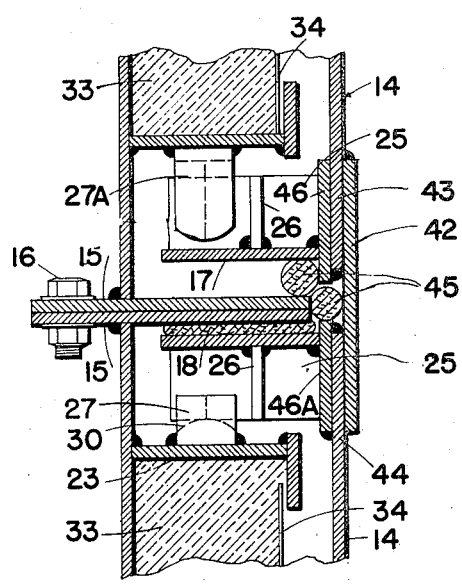
FIG. 6 is a fragmentary side sectional view similar to FIG. 2 but showing an alternative embodiment.

FIG. 6 shows an alternative embodiment of the telescopic junction between adjacent sections of the inner casing rather than intermediate the ends of sections.

In this embodiment an annular sleeve 42 is secured to the lower end 43 of the inner casing 14 and extends therebeyond. It engages over the upper end 44 of the next adjacent inner casing 14 in sliding relationship with annular packing material 45 being provided between annular collars 46 and 46A secured as by welding internally of the ends of the casing 14. In this embodiment, the annular flanges 17 are welded to these inner sleeves 46.

Figure 7:
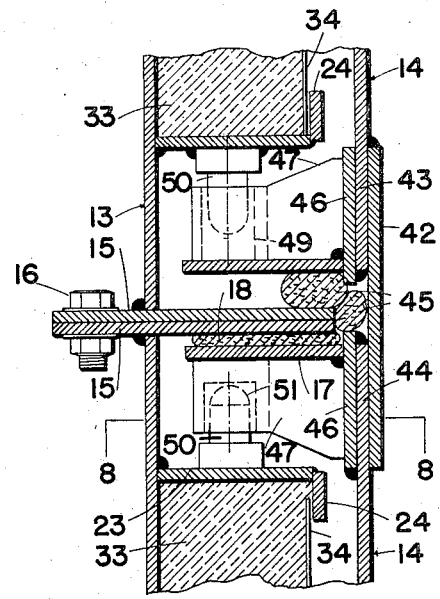
FIG. 7 is a view similar to FIG. 6 but showing a yet further embodiment.

FIG. 7 shows an alternative embodiment of the support and centering assembly for the inner casing 14 relative to the outer casing 13 and although the sliding junction between sections is similar to that shown in FIG. 6, nevertheless it will be appreciated that a sliding junction similar to that illustrated in FIG. 2 can be provided.

Figure 8:
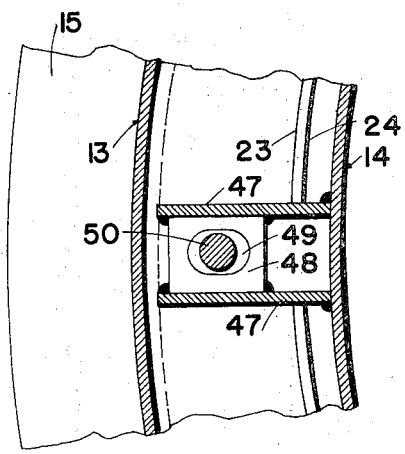
FIG. 8 is an enlarged fragmentary section substantially along the line 8—8 of FIG. 7.

In the embodiment shown in FIGS. 7 and 8, radially extending pairs of bracket supports 47 are secured to the flanges 17 and to the sleeve or collar 46 in turn secured to the inner casing 14.

An apertured plate 48 is secured between adjacent brackets 47 and this plate is provided with an elongated aperture 49 clearly shown in FIG. 8.

A bolt or stud member 50 is secured to and extending upwardly from the flange 23, there being one bolt or stud for each pair of brackets 47 and this bolt or stud engages freely the elongated aperture 49 as clearly shown in FIG. 8. This permits the radial and circumferential expansion and contraction of the inner casing relative to the outer casing.

Support of the inner casing relative to the outer casing is provided by the bolt or stud 50 being provided with a radiused outer end 51 which is engaged by the base of the aperture 49 once again giving point contact between the inner and outer casings and reducing considerably any heat transfer therebetween.

It will therefore be seen that the inner casing is supported for longitudinal radial and circumferential expansion and contraction movement relative to the outer casing with the minimum of metal connection or heat transfer connection existing between the two casings. Not only does this reduce the possibility of the temperature of the inner casing falling below the dew point, assisted by the radiant shield 34, but also eliminates entirely any stresses due to expansion and contraction of the inner casing, being transferred to the outer casing with the possibility of subsequent damage occurring thereto.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An insulated conduit section of a smokestack for the transmission of flue gases comprising in combination an outer casing and an inner casing having insulatively joining means, means for supporting said inner casing substantially concentrically within said outer casing and in spaced relationship therefrom, said means for supporting said inner casing also permitting relative radial movement due to radial expansion and contraction of said inner casing relative to said outer casing, said insulatively joining means including a peripheral flange secured to said inner casing adjacent one end thereof and extending outwardly therefrom, a plurality of supporting lugs secured to said inner casing and to said flange and extending radially outwardly from said inner casing, support means secured to and extending inwardly from said outer casing, pairs of retainer brackets extending from said support means, each pair engaging freely one upon each side of one of said supporting lugs, curved means between said pairs of retainer brackets engageable by the edge of the lugs therebetween in point contact for supporting said inner casing within said outer casing and permitting said relative radial movement therebetween, said inner casing including a separate upper portion and a separate lower portion, and a sliding sleeve joint overlapping and joining the adjacent ends of said portions, said sliding sleeve joint permitting longitudinal expansion and contraction of said inner casing relative to said outer casing.

2. The device according to claim 1 in which said insulatively joining means includes insulation between said inner and outer casings for resisting the transfer of heat between said inner casing and said outer casing, and a reflecting shield between said insulation and said inner casing to reflect heat back towards said inner casing.

3. The device according to claim 1 which includes sleeve means forming part of said sliding sleeve joint, and packing material within said sleeve means for sealing the junction between said upper and lower portions of said inner casing.

4. The device according to claim 2 which includes sleeve means forming part of said sliding sleeve joint, and packing material within said sleeve means for sealing the junction between said upper and lower portions of said inner casing.

* * * * *